United States Patent [19]

Geary et al.

[11] Patent Number: 4,615,586
[45] Date of Patent: Oct. 7, 1986

[54] LIQUID CRYSTAL DEVICES

[75] Inventors: John M. Geary, Scotch Plains; John W. Goodby, Berkeley Heights; Thomas M. Leslie, Clinton Township, Hunterdon County, all of N.J.

[73] Assignee: AT&T Bell Laboratories, Murray Hill, N.J.

[21] Appl. No.: 727,572

[22] Filed: Apr. 26, 1985

[51] Int. Cl.$^4$ ............................................. G02F 1/13
[52] U.S. Cl. ............................................. 350/350 S
[58] Field of Search .................. 350/350 S, 334, 337, 350/341

[56] References Cited

U.S. PATENT DOCUMENTS

| | | | |
|---|---|---|---|
| 4,083,797 | 4/1978 | Oh | 350/350 S X |
| 4,084,884 | 4/1978 | Raynes | 350/341 X |
| 4,219,255 | 8/1980 | Raynes | 350/350 S X |
| 4,257,911 | 3/1981 | Gray et al. | 350/350 S X |
| 4,405,208 | 9/1983 | Shirai | 350/341 |
| 4,526,704 | 7/1985 | Petrzilka et al. | 350/350 S X |

Primary Examiner—Donald A. Griffin
Attorney, Agent, or Firm—Bruce S. Schneider

[57] ABSTRACT

Liquid crystal devices having excellent speed are produced by utilizing an appropriate liquid crystal mixture. This mixture is prepared by selecting liquid crystal materials having opposite pitch and having specifically chosen spontaneous polarizations.

7 Claims, 9 Drawing Figures

LIQUID CRYSTAL DEVICES

BACKGROUND OF THE INVENTION

1. Field of the Invention

This invention relates to optical devices and, in particular, liquid crystal optical devices.

2. Art Background

Liquid crystal based devices are being used, and are being contemplated for use, in a wide variety of applications. These applications include uses that depend on relatively high-speed changes, i.e., changes faster than 5 milliseconds, in the optical state of the device. Exemplary of devices benefiting from high-speed operation are liquid crystal optical switches and liquid crystal large area displays, i.e., displays with more than $100 \times 100$ elements. The required optical change is generally produced by a change in molecular orientation of the liquid crystal material and is readable through a variety of optical expedients. (See *Applied Physics Letters*, 22, T. D. Beard et al, page 19 (1973), or *High Technology*, G. Graft, pages 55–69 (May 1984) for a description of liquid crystal optical switch configurations, and Graft supra for a review article describing a variety of other useful liquid crystal device configurations.)

Ferroelectric materials are one class of liquid crystal compositions being explored for use in high-speed devices. (See *Applied Physics Letters*, 36, N. A. Clark and S. T. Lagerwall, page 899 (1980) and *Applied Physics Letters*, 41, M. A. Handschy and N. A. Clark, page 39 (1982) for a description of various ferroelectric liquid crystal device configurations.) The characteristics of the device depend strongly on the properties of the ferroelectric liquid crystal being employed. The attainment of bistability, i.e., two optically different stable states where the relaxation time from one state to another is greater than 30 minutes, requires the pitch, i.e., the shortest distance between end points of a single twist of the helix in the liquid crystal phase, of the ferroelectric liquid crystal material to be at least 50 percent of the device thickness. The operating speed of a ferroelectric liquid crystal based device is also dependent on various liquid crystal material properties. For example, the viscosity and spontaneous polarization of the liquid crystal material are the primary influences for a given applied field, determining the speed at which the liquid crystal molecules can be spatially transformed and thus the speed at which optical changes are producible. However, it appears from present reports that the spontaneous polarization varies much more widely than the viscosity of ferroelectric liquid crystal materials, and thus the spontaneous polarization predominantly controls speed.

Generally, for a given applied electric field, the higher the spontaneous polarization, the faster the speed. However, the magnitude of applied electric fields is generally limited by practical considerations. The possibility of electrical breakdown of the liquid crystal material typically limits electric fields to less than 40 volts/$\mu$m. Similarly, typical switching electronics afford voltages yielding electric fields generally less than 36 volts/$\mu$m. It is desirable to have a spontaneous polarization above $0.2 \times 10^{-8}$ coul/cm$^2$ so that applied electric fields less than 36 volts/$\mu$m still afford device switching speeds faster than 5 milliseconds.

As discussed, in ferroelectric devices it is quite desirable to utilize a liquid crystal material having a long pitch and a high spontaneous polarization. However, individual ferroelectric materials with long pitch, e.g., greater than 10 $\mu$m, essentially invariably have a correspondingly low spontaneous polarization. Thus, the possibility of high-speed operation of ferroelectric liquid crystal devices for nominal device thicknesses and applied electric fields has been an illusive goal. Only one specific mixture of ferroelectric materials, i.e., (HOBACPC)

(DOBAMBC), has been reported to produce large pitches. (See *JEPT Letters*, 33(10), Beresnev et al, page 536 (1981).) However, the materials are not suitable for device applications because they are unstable, i.e., exhibit unacceptable degradation, i.e., greater than a 10 percent change in the clearing point over a period of 1 month. Thus, the attributes required for a stable high-speed device that operates at nominal applied electric fields have not been realized.

SUMMARY OF THE INVENTION

Stable devices having extremely large pitches and having spontaneous polarizations greater than $0.2 \times 10^{-8}$ coul/cm$^2$ are producible by utilizing specifically chosen ferroelectric liquid crystal mixtures. These mixtures include at least two stable liquid crystal ferroelectric components. The first should have an opposite twist sense from that of the second. Additionally, these mixtures are produced by choosing stable liquid crystal materials having appropriate stereochemistry and an appropriate polarization-enhancing moiety bound to the chiral center.

DETAILED DESCRIPTION

The inventive devices involve the choice of specific mixtures of stable liquid crystal materials having chiral (asymmetric) centers. These mixtures are utilized in device configurations such as those employed for one component, ferroelectric liquid crystal based structures. For example, the liquid crystal mixture is utilized in a device described in copending, coassigned U.S. patent application Ser. No. 361,361, filed Mar. 23, 1982 (J. W. Goodby-T. M. Leslie Case 1-1), or as described in *Applied Physics Letters*, 1, N. A. Clark and S. T. Lagerwall (1980). However, the liquid crystal mixture is formed to have both a large pitch, e.g., a pitch greater than 20 $\mu$m, and to have a relatively large spontaneous polarization, i.e., a spontaneous polarization greater than $0.2 \times 10^{-8}$ coul/cm$^2$.

A long pitch is obtained by mixing at least a first and second ferroelectric liquid crystal material with opposite helical twist directions. (If more than two liquid crystal materials are utilized, the resultant pitch of the materials with one type (right- or left-handed) twist should substantially offset the resultant pitch of materials with the opposite twist.)

Although rules for determining twist direction in nematic liquid crystals have been proposed (*Molecular Crystals, Liquid Crystals Letters*, 34, G. W. Gray and D. G. McDonnell, page 211 (1977)), these rules are inadequate for ferroelectric liquid crystal materials. The twist direction of a ferroelectric liquid crystal, i.e., a liquid crystal with a chiral center, is determinable by consideration of three factors: the inductive effect at the chiral center, the absolute spatial configuration about the chiral center, and a determination of the molecular position of the chiral center substituents relative to the core (parity). Spatial configuration in this context is assigned in the S-R system. This system is extensively described in *Stereochemistry of Carbon Compounds*, Eliel, McGraw-Hill, New York (1962). Briefly, the molecular tetrahedron around the chiral center is viewed from the side opposite the substituent of lowest priority. The remaining three substituents are given designations Z, Y, and X, with Z being the highest priority and X being the lowest priority. A configuration is S if Z, Y, and X are oriented in a counterclockwise sequence of priority and is R if Z, Y, and X are oriented in a clockwise sequence. Detailed rules for assigning priority are extensively discussed in *Journal of the Chemical Society*, R. S. Cahn and C. R. Ingold, page 612 (1951) and Eliel supra and *Vocabulary of Organic Chemistry*, Orchin et al, Wiley & Sons (1980). Basically, a substituent has highest priority if the atom of this substituent bound to the chiral center has the highest atomic number. If two substituents have the same atom bound to the chiral center, precedence is given to the substituent having the second atom of higher atomic number, with the second substituent's atomic number being multiplied by the number of bonds between the second atom and the first atom. Thus, for example, in the molecule the substituent of lowest order is H (Q), substituent Z is Cl, substituent Y is CH$_2$OH, and substituent X is CH$_3$. As a result, the molecule shown in a spatial orientation as with the hash marks indicating a direction into the page has an S configuration.

The assignment of R or S configuration fixes the spatial arrangement of the substituents about the asymmetric center. Consideration of this arrangement relative to the spatial position of the core determines the second factor in determining the twist direction of a ferroelectric liquid crystal material, i.e., the position of the chiral center substituents relative to the core of the molecule. The core of the molecule includes the longest progression of sequentially bound atoms which are unable to undergo a change in conformation—generally for ferroelectric liquid crystal materials, this is the longest chain of atoms whose bond order to their next nearest neighbor(s) is greater than 1.5. Thus, in the molecule the core ends as indicated by the dotted line. Similarly, in the molecule the core ends at the C—C bond of the linkage adjacent to the benzene terminal alkyl chain which carries the chiral center, and in the molecule the core ends at the C (aromatic)—O ether bond of the ether linkage of the alkyl chain carrying the chiral center and the first benzene ring. (Atomic bond orders in specific functional groups in a wide variety of molecular environments are listed in compilations such as *Advances in IR Group Frequencies*, L. J. Bellamy, Mathuen (1968), and *Organic Electronic Spectral Data*, Vols. I to XIX, Interscience (1946–1977).) Once the atoms forming the core are delimited, the position of the two shortest substituents on the chiral carbon relative to this core is determined for the molecule in an all trans conformation. Thus, in formula (1), the chiral center substituents are positioned as follows:

and in formula (2), the chiral center substituents are positioned as follows:

while in formula (3), it is

A molecule is outside, i.e., of even parity, if the chiral center substituents are directed away from the long axis of the core, and is inside, i.e., of odd parity, if the chiral center substituents are directed toward this axis.

Figure 9:
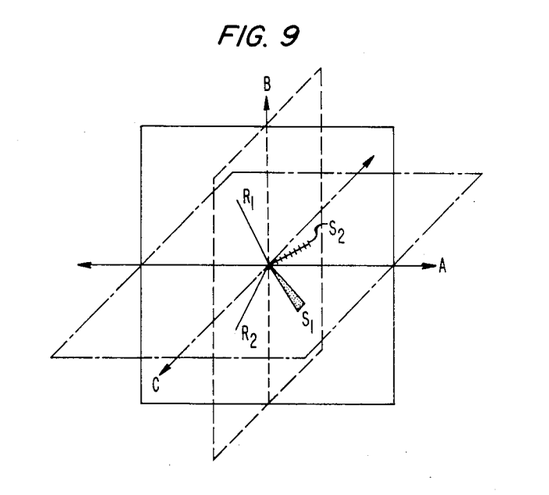

The third factor determining the twist direction is the electron inductive effect at the chiral center. To determine the direction of this electron inductive effect, a right-handed coordinate system with axii A, B, and C, as shown in FIG. 9, is established. The first and second substituents, $S_1$ and $S_2$, are oriented so that they mutually lie in the +A, +C plane. As a result, the core, $R_1$ in FIG. 9, and the terminal chain, $R_2$ in FIG. 9, lie in the AB plane. In this way, the spatial configuration of $R_1$ and $R_2$ for this determination is fixed. Each of the substituents has either an electron withdrawing or donating effect across the BC plane. (For convenience, H is considered zero inductive effect, and everything is measured relative to H.) If the sum of the inductive effects is in the +A direction, the inductive effect for purposes of twist sense is negative, and if it is in the −A direction, the inductive effect for purposes of twist sense is positive.

Once the three factors (parity, configuration, and inductive effect) have been determined, the twist direction of the molecule is also determined. The following Table 1 shows the twist direction for the various possible configurations.

TABLE 1

| ε Inductive Effect | Parity | Twist Handedness | Absolute Configuration $R_1$ Higher Priority | Absolute Configuration $R_2$ Higher Priority |
|---|---|---|---|---|
| +I | e | d | S | R |
| +I | o | d | R | S |
| −I | e | l | S | R |
| −I | o | l | R | S |
| +I | e | l | R | S |
| +I | o | l | S | R |
| −I | o | d | S | R |
| −I | e | d | R | S |

(As noted, if the core is the highest priority, as in then the S and R orientation is reversed relatived to a configuration for a compound such as where $R_2$ has a higher priority than the core.)

As discussed, not only is the twist direction important, but the tightness of this pitch is also significant. Generally, the closer the chiral center is to the core, the shorter the pitch. Thus, to offset the twist direction to a long pitch, e.g., a pitch longer than 20 μm, a molecule such as requires a greater mole percentage of a molecule such as than of a molecule such as

To produce a mixture of components having a long pitch, suitable quantities (depending on the shortness of the pitch of the individual components) are chosen for components having opposite twist direction.

Figure 1:
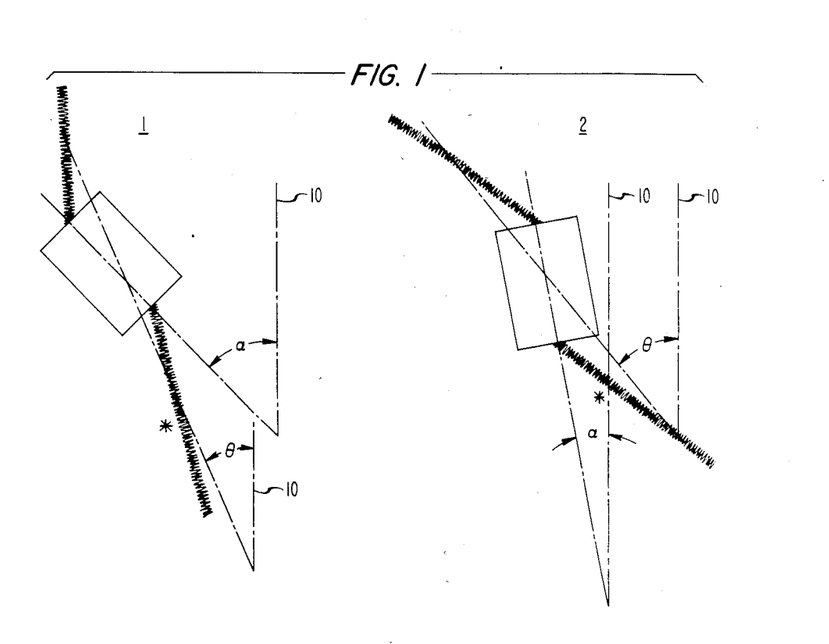
FIGS. 1, 2, and 9 illustrate properties relating to the configuration and conformation of ferroelectric liquid crystals.

As also previously discussed, not only is pitch important for the operating properties of a device, but the spontaneous polarization magnitude is also quite significant. The direction (i.e., sense) of $P_s$ is determined by three factors: (1) the tilt orientation of the liquid crystal material, (2) the direction of the lateral component of the dipole at the chiral center relative to the tilt axis, and, (3) the conformational structure of the terminal chain between the core and the chiral center. The two possible tilt configurations are shown in FIG. 1 at 1 and 2. The illustration 1 shows a configuration with the core more tilted relative to the ferroelectric phase layer planes than the configuration of 2. In this depiction, the core is shown by the square box and the chiral center by the star. It is possible to characterize a particular configuration by a comparison of the tilt angles of the molecules relative to normals, 10, of the ferroelectric phase layer boundary. This angle is determined by X-ray analysis and optical polarization analysis. (See *Molecular Crystals and Liquid Crystals*, 75, Ph. Martinot-Lagarde et al, page 249 (1981), for a description of the latter determination and *Annals de Physique*, 3, R. Bartolino et al, page 389 (1978), for a description of the former.) The X-ray determination yields the tilt angle of the overall molecules, i.e., the direction of the average electron density (the direction shown by $\theta$ in FIG. 1), while the optical determination yields the tilt angle of the delocalized electrons of the core, e.g., the direction shown by $\alpha$ in FIG. 1. In configuration 1, the angle $\alpha$ is bigger than $\theta$, and thus the optical tilt angle is greater than the corresponding angle between the normal and the X-ray direction. In configuration 2, the opposite is the case. Thus, the particular configuration of a liquid crystal material in the mixture is determined by ascertaining the optical and X-ray direction and comparing these directions. (It should be emphasized that the orientation of a molecule in the bulk is not necessarily the same as the orientation of the molecule in a mixture with a different material. It is only its orientation in the mixture which is significant.) To determine the direction of the lateral component of the dipole at the chiral center relative to the tilt axis, the core of the molecule is oriented along the x direction of a right-handed coordinate system. The longest terminal methylene chain bound to the chiral center and remote from the core relative to this chiral center is oriented in the $-x+y$ quadrant of the xy plane of the right-handed coordinate system. The rest of the molecule is positioned in its most extended all trans format so that the other alkyl chain is in the $+x-y$ quadrant, i.e., longest continuous bonding of atoms is in the xy plane, with the axis of the core lying as close as possible to the x axis and centered at the origin. The spatial position of the two remaining components is thus determined by the absolute configuration of the molecule. Each of these remaining substituents has either an electron withdrawing or donating effect across the xy plane, i.e., above or below the xy plane, in which the chiral center is contained. (For convenience, H is considered zero inductive effect, and everything is measured relative to H.) If the sum of these two effects is in the $+z$ direction, i.e., the electron density lies in the $+z$ direction, the molecule is considered $+\text{In}$, while if it is in the $-z$ direction, the molecule is considered $-\text{In}$. For example, in the configuration methyl has a $+\text{In}$ component of the dipole in the $+z$ direction, and hydrogen is zero inductive effect, i.e., methyl is $+\text{In}$ relative to hydrogen. Thus, this molecule has a $+\text{In}$ lateral component of the dipole relative to the long axis of the molecule.

Figure 2:
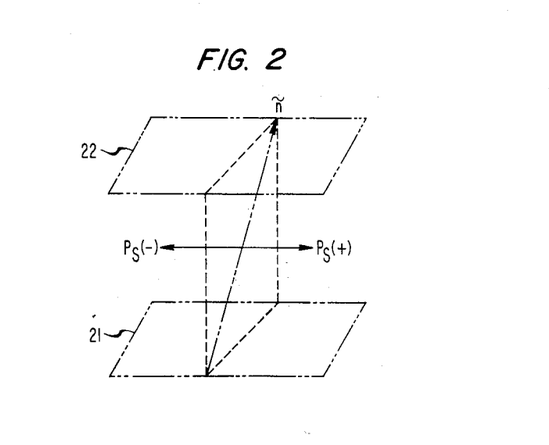

As previously discussed, the bond conformation between the core and the chiral center is also significant. It is possible that the terminal chain between the core and the chiral center has trans bonds, i.e., gauche bonds, i.e., or a combination of gauche and trans bonds. Combinations of trans and gauche bonds where there is an odd number of gauche bonds will result in changes in the sign of In relative to the all trans format. The tilt angle, dipole direction, and conformation (trans, gauche) then determine the direction of $P_s$ in accordance with the following Table 2. (The meaning of $P_s(+)$ and $P_s(-)$ is shown in FIG. 2 where n is the liquid crystal director, i.e., the average direction of the long axis of the molecules in a layer of the phase where 21 and 22 are the layer planes.)

TABLE 2

| Dipole Component | Tilt | Even Number Or Zero Gauche Bonds | Odd Number Of Gauche Bonds |
| --- | --- | --- | --- |
| $+\text{In}$ | $\alpha > \theta$ | $P_s(-)$ | $P_s(+)$ |
|  | $\theta > \alpha$ | $P_s(+)$ | $P_s(-)$ |
| $-\text{In}$ | $\alpha > \theta$ | $P_s(+)$ | $P_s(-)$ |
|  | $\theta > \alpha$ | $P_s(-)$ | $P_s(+)$ |

When components are chosen to offset pitch, their polarizations, depending on the orientation of the material in the mixture, either complement or offset each other. If materials are utilized which occupy opposing configurations in the mixture, then their polarizations will enhance each other; while if the orientations are identical, their polarizations will offset each other.

In the polarization enhancement case, a spontaneous polarization greater than $0.2 \times 10^{-8}$ coul/cm$^2$ is easily achieved since the polarizations are averaged. (Even in the averaging situation, if one component has a relatively low $P_s$, the greater the percentage of this component in the mixture, the lower the total $P_s$.) However, in the offset case, to avoid a low spontaneous polarization, the liquid crystal components of the mixture should be chosen so that their spontaneous polarizations, weighed by their mole fraction in the mixture, sum algebraically to a value larger than $0.2 \times 10^{-8}$ coul/cm$^2$. In the offsetting polarization situation, the amount of each component in a mixture is determined by the requirement that the pitch have a length of at least 50 percent of the cell thickness. The mole fraction of each component in the mixture required to satisfy this criterion, in turn, determines the coefficients for each spontaneous polarization contribution in the algebraic sum determining the net spontaneous polarization of the mixture. It has been found that the spontaneous polarization is, in fact, generally an essentially linear function of the percentage of each component in the mixture. Thus, the net spontaneous polarization is well approximated by first preparing a graph of $P_s$ versus percentage of the components in the mixture. The spontaneous polarization at the extremes, i.e., 0 and 100 percent of a particular component in the mixture, is plotted and these end points connected by a straight line. (In the case of a more than two-component mixture, the end points are connected by a suitable dimensional plane.) The ordinate for the abscissa corresponding to the percentage of components in the mixture required to satisfy the pitch criterion gives an appropriate approximation of the spontaneous polarization obtained. If the spontaneous polarization is greater than $0.2 \times 10^{-8}$ coul/cm$^2$, the mixture is satisfactory. If, however, a value less than $0.2 \times 10^{-8}$ coul/cm$^2$ is obtained, the liquid crystal materials of the composition should be suitably modified to increase the spontaneous polarization.

Any mixture yielding the desired pitch and spontaneous polarization is acceptable. However, in the offsetting situation, spontaneous polarizations greater than $0.2 \times 10^{-8}$ coul/cm$^2$ are generally obtained when the higher mole percentage component of the mixture is chosen to have a significantly larger, i.e., larger than $0.4 \times 10^{-8}$ coul/cm$^2$, spontaneous polarization than the lower mole percentage component. To increase the spontaneous polarization of a molecule, moieties that complement or at least do not completely offset each other's inductive effect are positioned on the chiral center. The greater the electron donating or withdrawing power relative to each other, the higher the spontaneous polarization.

Exemplary of suitable mixtures for producing the combined effects of small pitch and relatively high spontaneous polarization are Sed + I P$_s$(−)

28.2 weight percent

Sed + I P$_s$(−)

49.8 weight percent

Sed + I P$_s$(−)

21.9 weight percent

SA <—> Iso Liq 93° C.
SA <—> Sc* 43° C.
Pitch 1.7–1.8 μm at 25° C.

The synthesis of these molecules is fully described in copending, coassigned U.S. patent application Ser. No. 361,361, filed Mar. 23, 1982 (J. W. Goodby-T. M. Leslie Case 1-1), which is hereby incorporated by reference. Although in this incorporated application the presence of atoms or substituents such as Cl, Br, CN, etc., on the chiral center are not described, the synthesis is analogous, except starting materials such as S—2-chloromethylpropionate (converted as described in *Journal of the American Chemical Society*, 81, R. F. Nystrom, page 610 (1958)) and 1-Ethyl lactate (converted as described in *Comptes Rendus Acadamie de Sciences,* 282i, P. Keller et al, page 639 (1976)), which are commercially available, are utilized rather than the starting material S—2-Methylbutanol.

The following examples are illustrative of the invention.

EXAMPLE 1

Methods of Measurement

Figure 3:
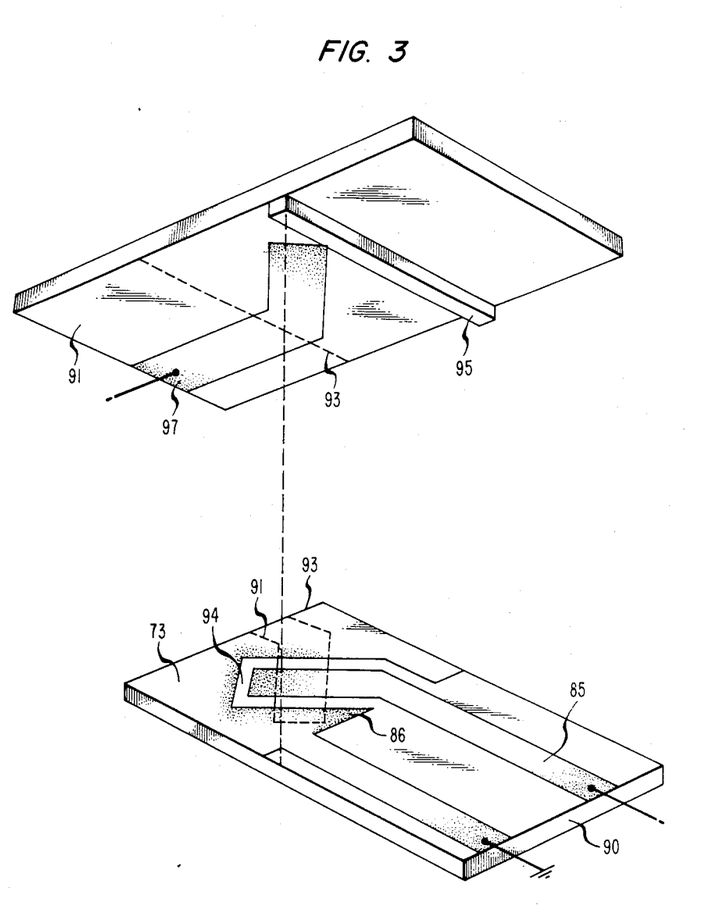
FIGS. 3 and 5 are illustrative of cells useful in measuring the properties of ferroelectric liquid crystals.

The pitch and spontaneous polarization (P$_s$) of the compounds described in these Examples were measured by first preparing glass slides measuring approximately 1 inch×0.75 inch that were coated on one side by an indium tin oxide (ITO) film. These slides were immersed in ultrasonically agitated soapy water and rinsed in deionized water. The slides were then dried in a freonisopropyl alcohol dryer. The pattern shown in FIG. 3 was etched in the ITO layer of each slide, using conventional photolithography processes and an aqua regia etchant. The gap between ITO region 73 and ITO region 85, as shown at 94, was approximately 30 μm. The two slides were coated on the ITO side with a polymeric material—polyethylene terephthalate (PET) on one slide of a cell and the poly(methyl methacrylate) on the other slide. Only the PET was rubbed with a cotton cloth. (A full description of this alignment technique is described in concurrently filed, co-pending U.S. patent application Ser. No. 727,690 denominated filed 4/26/85, which is hereby incorporated by reference. Additionally, a supplementary aligning technique through the bulk of the material is described in concurrently filed U.S. patent application Ser. No. 727,573 denominated filed 4/26/85, which is hereby incorporated by reference.) The two glass slides were then overlapped (ITO side inward) so that a cross pattern was formed between one glass slide 90 and the second glass slide, 91. A spacer 95 was inserted between the slides, and the edge 93 of one slide contacted the second slide. Thus, a wedge-like opening between the two slides was formed. The cell was then placed in an oven. This oven had an optical viewing port which allowed access to the sample and which was positioned so that the sample could be viewed with a polarizing-light microscope. The cell was heated to a temperature approximately 5 degrees higher than the isotropic clearing point of the liquid crystal material to be measured. A portion of the sample was placed on the end of a solid glass rod and the glass rod inserted into the oven. The rod was maintained in the oven until the liquid crystal sample material reached its isotropic clearing point. Utilizing the glass rod, the material was then touched to region 93 so that the wedge filled with the material by capillary action. The rod was then removed from the oven. The sample was cooled until transition into the smectic A phase was observed by an indication of birefringence in the microscopic examination. During the transition, the rate of temperature decrease was limited to approximately 1 degree per minute. After the transition temperature was passed, the sample was again cooled more rapidly until the transition between the smectic A and smectic C phases was observed through a characteristic change in texture, i.e., a change from a smooth to a mottled texture. (See, for example, "Textures of Liquid Crystals," D. Demus and L. Richter, *Verlag Chemie,* Weinheim, New York (1978).)

Figure 4:
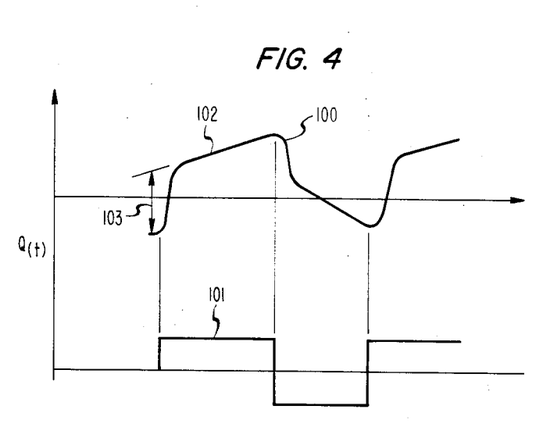
FIGS. 4, 6, 7, and 8 are the results of measurements relating to the spontaneous polarization.

A symmetrical square wave voltage was applied to electrode 97. The charge flowing along electrode 85 was monitored utilizing an integrated operational amplifier and was displayed on an oscilliscope as a function of time. An illustrative output of this measurement is shown in FIG. 4, where curve 100 is the measured output and curve 101 is the applied voltage. The straight portion 102 of curve 100 was extrapolated back to the time that the applied voltage changed polarity, and the height, 103, of the curve, i.e., ΔQ, at this time was measured. The amplitude of the applied voltage was then increased and ΔQ then measured. Voltage curves and subsequent measurements were continued until ΔQ did not further increase. The $P_s$ for the sample material was then calculated as one-half the quotient of (1) ΔQ and (2) the area of the overlap between electrode 97 and electrode 85. This measurement for $P_s$ was performed at a variety of temperatures. (The temperatures employed are shown as reduced temperatures, i.e., the difference between (1) the temperature of measurement and (2) the transition temperature from smectic A to smectic C phase.)

The pitch was then measured at a temperature that was removed at least 5 degrees from any phase transition point. This pitch was measured at a point, for example, 86, that was removed from any area to which an electric field was applied and that was near the spacer—near the thickest portion of the cell. Generally, a series of regularly spaced bands was observed, corresponding to equally spaced optical disclinations. If this regularly spaced ordering was observed, the pitch corresponded to the distance between dark lines and was measured by conventional microscopic techniques. If the regular spacing was not observed, a new cell was modified to allow observation through a thicker portion of liquid crystal material. However, typically, if regular bands were not observed at thicknesses greater than 50 μm, it was assumed that pitch was extremely large, and further measurements were not made.

Figure 5:
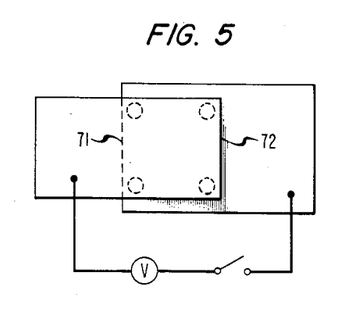

To measure the twist sense and direction of $P_s$ and to measure the pitch of some unmixed liquid crystal materials, a different cell was prepared. This cell included two ITO-coated glass slides measuring 0.50×0.75 inch that were overlapped, as shown in FIG. 5, to give an overlap area of about 0.50 inch square. The ITO regions were kept on the interior of the cell coated with PET, and these PET regions were both rubbed in the same direction. The corners of the overlapped areas had 30 μm spacers which were spatially fixed with epoxy adhesive. A material with known twist sense that had a smectic C temperature range overlapping that of the test material was heated to its isotropic clearing point. The known material was then introduced to edge 72 of the cell and allowed to fill approximately one-half the cell by capillary action. When the cell was half filled, it was placed on a cold stage to prevent further filling. The excess standard material was then removed from the edge of the cell. The test material was then heated to its isotropic clearing point and introduced at edge 71 to complete the filling of the cell and to form a direct contact between the standard and the test material. A wire was bound to each ITO region utilizing silver paste. The temperature of the cell was raised to the isotropic clearing point of both materials by placing it in an oven such that the sample can be observed utilizing a polarizing-light microscope. The temperature was then lowered, as previously described, for the measurement of $P_s$. The bands ultimately formed in the smectic C phase were then observed. A discontinuity of bands in the region between the standard and test material indicated opposite twist sense, while continuity in this region indicated the same twist sense. The pitch was also measured in this cell by measuring the distance between the bands in the test material. The wire contacting the bottom slide of the cell was connected to the negative electrode of a 67.50-volt battery. The stage of the microscope was rotated until the sample in the smectic A phase appeared black, as viewed through a crossed polarizer. The sample was then cooled again into the smectic C phase. The silver wire attached to the top electrode was then connected to the positive terminal of the 67.5-volt battery. The sample became brighter. The sample was then rotated until it again appeared dark through the polarizing-light microscope. (The stage was rotated in a direction yielding an observed dark portion with a rotation of less than 90 degrees.) The direction of rotation indicated the sign of the spontaneous polarization. A rotation in the clockwise direction looking down on the stage corresponded to a negative spontaneous polarization, and a counter-clockwise direction corresponded to a positive spontaneous polarization. (This measurement was done for test samples whose optical tilt angle was less than 45 degrees.)

EXAMPLE 2

Table 3 shows a wide variety of compounds, their configuration, inductive effect, the twist, and the $P_s$ direction. Compounds 1-24 are those having a levo rotation which is equivalent to a right-handed helix and which have a positive $P_s$ or have dextro rotation and a negative $P_s$ Compounds 30-35 are those having a right-handed twist sense corresponding to a left-handed helix and which have a positive $P_s$ or a levo rotation and a negative $P_s$. Compounds 25 and 26 illustrate the effect of the chiral center being off the molecular axis, i.e., the inside-outside effect. Compounds 27-29 indicate the effect of the chiral substituent having a gauche rather than a trans conformation, i.e., a conformational change in the terminal chain. (Generally, this gauche conformation occurs when the chiral center is removed at least 5 carbon atoms from the core. As a result, for these compounds, the $P_s$ is typically relatively small.)

The following is a description of how each of the Table 3 compounds was synthesized. Compound 20 was purchased from CPAC Organic Specialties Group. Compound 30 was purchased from BDH Chemicals, Poole, England. Compounds 1, 2, 14-16, 23, 24, 27-29, and 31-34 were prepared as described in co-pending U.S. patent application J. W. Goodby-T. M. Leslie Case 1-1, which is hereby incorporated by reference. Compound 17 was prepared as described in J. W. Goodby-T. M. Leslie Case 1-1, except s-citronellol was employed, rather than s-2-methylbutanol, in the final esterification. Compounds 3-10 were prepared as described in J. W. Goodby-T. M. Leslie Case 1-1, except hydrogenated s-citronellol was employed rather than s-2-methylbutanol. This hydrogenation was accomplished by forming a solution of 100 grams of citronellol in 100 ml of ethyl acetate. One gram of platinum oxide was added to the resulting solution, and the mixture was subjected under agitation to a back pressure of 12 psi of hydrogen for 8 hours in a Parr low pressure hydrogenator. The hydrogenated mixture was allowed to stand for 16 additional hours, and the catalyst was removed by filtration. (The catalyst during filtration is kept wet to avoid combustion.) The solvent was removed by vacuum evaporation, and the liquid residue was distilled. The fraction boiling at 208–210 degrees C. was collected during this fractional distillation. The yield was approximately 98 percent.

Compounds 11 and 12 were prepared as described in J. W. Goodby-T. M. Leslie Case 1-1, except the brominated product of the citronellol hydrogenation was employed rather than 2-methylbutylbromide. This bromination of the hydrogenated citronellol was performed according to the procedure described in J. W. Goodby's Ph.d thesis, University of Hull, England, 1978, at page 315. (This citation involved the bromination of 2-methylbutylbromide, but the preparation is the same for the hydrogenated citronellol.) Compound 13 was prepared as described in J. W. Goodby-T. M. Leslie Case 1-1, except 2-butanol was utilized in the final esterification rather than 2-methylbutanol. Compound 18 was prepared as described in J. W. Goodby-T. M. Leslie Case 1-1, except the final esterification was carried out using 4-n-octyloxybenzoyloxybenzoic acid rather than 4-n-octyloxybenzoic acid.

Compounds 21 and 22 were prepared to demonstrate the effect of the dipole direction at the chiral center. The compounds 21 and 22 were prepared from the commercially available compound s-methyl chloro propionate. This compound was reduced by lithium aluminum hydride in accordance with the method of Nystrom supra to yield 2-chloropropanol. The 2-chloropropanol was esterified with para nitro cinnamic acid by the method described in J. W. Goodby-T. M. Leslie Case 1-1, utilizing thionyl chloride and pyridine as the operative reagents. This esterification yielded 4-nitro-(2-chloropropyl)cinnamate which was then reduced in the presence of hydrogen and a ruthenium catalyst, according to the method of A. Onopchenko et al, *Journal of Organic Chemistry*, Vol. 44, page 3671 (1979). The resulting product was 4-amino-(2-chloropropyl)cinnamate. This para amino compound was condensed with the appropriate 4-n-alkoxybenzaldehyde to yield the desired compound. The 4-n-alkoxybenzaldehyde was prepared by adding approximately 9 grams of p-hydroxybenzaldehyde to 110 ml of dry acetone. Approximately 44 grams of anhydrous potassium carbonate were added to this solution over a period of 30 minutes to prevent lumping. Approximately 0.084 mole of 1-bromoalkane (the particular alkane depending on whether compound 21 or 22 is being prepared) was added dropwise. The resulting mixture was refluxed for 12 hours with vigorous agitation under dry conditions.

The reaction mass was added to 500 ml of water and the desired product extracted with two 100 ml aliquots of ether. The etherial extract was dried anhydrous magnesium sulfate. The filtered solution was evaporated to dryness, and the residue was distilled at reduced pressure. (In the case of the n-butyl compound, the desired fraction was collected at 110 degrees C. at 1 mm of mercury, and in the case of the n-hexyl, the desired fraction was collected at 132 degrees C. at 1 mm of mercury.)

Compounds 25 and 26 were prepared according to the procedure described by Goodby and Gray in *Journal de Physique* C3, 40, 27 (1979), except hydrogenated citronellol was substituted for 2-methylbutanol. The final esterification was performed as described in J. W. Goodby-T. M. Leslie Case 1-1. Compound 35 was prepared by first synthesizing decylthiophenol according to the preparation described by M. Neubert et al in *Molecular Crystals, Liquid Crystals*, 54, 221 (1979). The compound was esterified with 2-methylbutyloxybiphenyl 4-carboxylic acid, as described in J. W. Goodby-T. M. Leslie Case 1-1.

EXAMPLE 3

Figure 6:
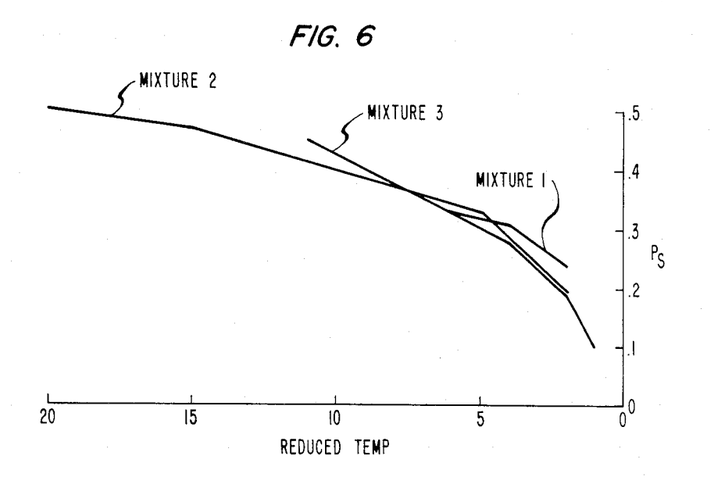
Figure 7:
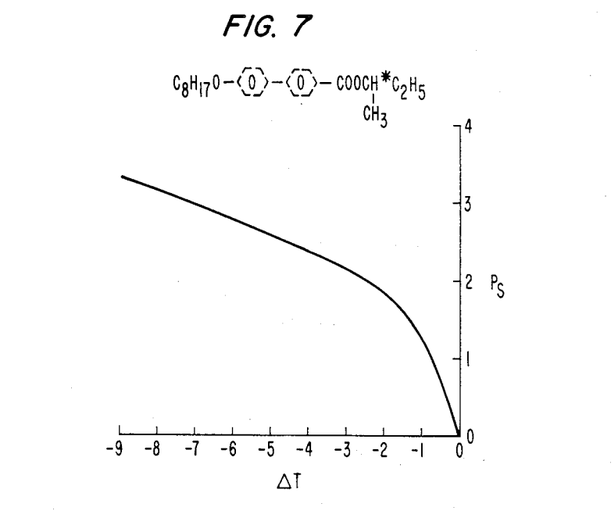
Figure 8:
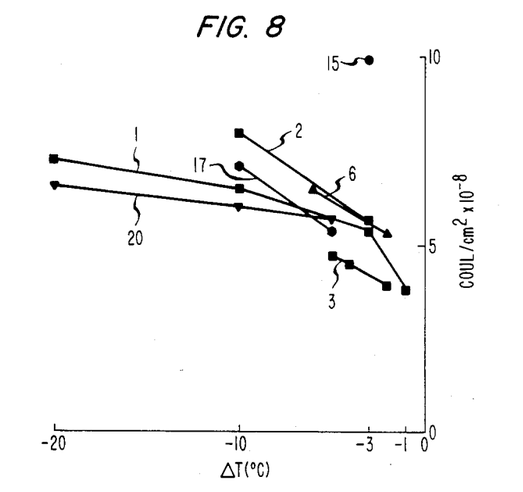

Three mixtures were prepared. Mixture 1 included 26.1 weight percent of compound 15, 25.6 weight percent of compound 13, and 48.3 weight percent of compound 17. (All mixtures were prepared by combining the appropriate weight percentages of each compound, heating the mixture to its isotropic clearing point, and then violently agitating it.) The resulting mixture had a phase transition from isotropic to smectic A at 52 degrees C. and from smectic A to smectic C at 23 degrees C. The second mixture was prepared from 52.4 weight percent of compound 11 and 47.6 weight percent of compound 34. This mixture had an isotropic to smectic A transition at 62.3 degrees C. and smectic A to smectic C at 48.2 degrees C. A third mixture was prepared by combining 59.3 weight percent of compound 11, 27.7 weight percent of compound 34, and 13 weight percent of compound 15. This mixture had an isotropic to smectic A transition at 64.3 degrees C. and a smectic A to smectic C transition at 30.1 degrees C. The reduced temperature versus $P_s$ plot for each of these mixtures is shown in FIG. 6. FIG. 7 shows the reduced temperature versus $P_s$ curve for compound 13. The data, shown in FIG. 7, was obtained by extrapolation to a 100 percent presence of compound 13 from data obtained for a mixture of compound 13 and n-hexyl 4-n-decyloxybiphenyl-4-carboxylate. FIG. 8 shows the $P_s$ versus reduced temperature for a variety of other compounds in Table 3 with the callout indicating the compound number in this Table.

(1) $C_8H_{17}O$—⟨O⟩—COO—⟨O⟩—COO2M4    Sed + I $P_s(-)$

(2) $C_{14}H_{29}O$—⟨O⟩—COO—⟨O⟩—COO2M4    Sed + I $P_s(-)$

-continued

(3)  C₈H₁₇O—⌬—COO—⌬—COO3M7M8¹   Sol + I P$_s$(+)

(4)  C₉H₁₉O—⌬—COO—⌬—COO3M7M8   Sol + I P$_s$(+)

(5)  C₁₀H₂₁O—⌬—COO—⌬—COO3M7M8   Sol + I P$_s$(+)

(6)  C₁₁H₂₃O—⌬—COO—⌬—COO3M7M8   Sol + I P$_s$(+)

(7)  C₁₂H₂₅O—⌬—COO—⌬—COO3M7M8   Sol + I P$_s$(+)

(8)  C₁₃H₂₇O—⌬—COO—⌬—COO3M7M8   Sol + I P$_s$(+)

(9)  C₁₄H₂₉O—⌬—COO—⌬—COO3M7M8   Sol + I P$_s$(+)

(10)  C₁₆H₃₃O—⌬—COO—⌬—COO3M7M8   Sol + I P$_s$(+)

(11)  C₁₀H₂₁O—⌬—COO—⌬—O3M7M8   Sed + I P$_s$(−)

(12)  C₁₀H₂₁O—⌬—OCO—⌬—O3M7M8   Sed + I P$_s$(−)

(13)  C₈H₁₇O—⌬—⌬—COO1M3²   { Rod + I P$_s$(−)  Sed + I P$_s$(+) }

(14)  C₈H₁₇O—⌬—⌬—COO2M4³   Sed + I P$_s$(−)

(15)  C₁₀H₂₁O—⌬—⌬—COO2M4   Sed + I P$_s$(−)

-continued

| | | |
|---|---|---|
| (16) | C₈H₁₇O—⌬—⌬—COO3M5⁴ | Sol + I P_s(+) |
| (17) | C₁₂H₂₅O—⌬—⌬—COO3M7M8(2E)⁵ | Sol + I P_s(+) |
| (18) | C₈H₁₇O—⌬—COO—⌬—COO—⌬—COO2M4 | Sed + I P_s(−) |
| (20) | C₁₀H₂₁O—⌬—CH=N—⌬—CH=CHCOO2M4 | Sed + I P_s(−) |
| (21) | C₄H₉O—⌬—CH=N—⌬—CH=CHCOO2C13⁶ | Sed − I P_s(+) |
| (22) | C₆H₁₃O—⌬—CH=N—⌬—CH=CHCOO2C13 | Sed − I P_s(+) |
| (23) | 4M6O—⌬—COO—⌬—COO—⌬—O4M6⁷ | Sol + I P_s(+) |
| (24) | 4M6O—⌬—COO—⌬—COO—⌬—OC₆H₁₃ | Sol + I P_s(+) |
| (25) | C₁₄H₂₉O—⌬—COO—⌬—C(=O)2M6M7 | Sol + I P_s(+) |
| (26) | C₈H₁₇O—⌬—⌬—COO—⌬—C(=O)2M6M7⁸ | Sol + I P_s(+) |
| (27) | C₉H₁₉O—⌬—COO—⌬—COO4M6 | Sed + I P_s(+) |
| (28) | C₇H₁₅O—⌬—OCO—⌬—O4M6 | Sed + I P_s(−) |
| (29) | C₉H₁₉O—⌬—OCO—⌬—O4M6 | Sol + I P_s(−) |

| | | |
|---|---|---|
| -continued | | |
| (30) |  C₈H₁₇—⬡—⬡—COO—⬡—2M4 | Sed + I P$_s$(+) |
| (31) |  C₇H₁₅O—⬡—COO—⬡—CH=CCOO2M4 with CN | Sed + I P$_s$(+) |
| (32) | C₁₂H₂₅O—⬡—COO—⬡—CH=CCOO2M4 with CN | Sed + I P$_s$(+) |
| (33) | C₈H₁₇O—⬡—COO—⬡—CH=CCOO2M4 with CN | Sed + I P$_s$(+) |
| (34) | C₁₀H₂₁O—⬡—COO—⬡—O2M4 | Sol + I P$_s$(−) |
| (35) | C₁₂H₂₅—⬡—SOC—⬡—⬡—O2M4 | Sol + I P$_s$(−) |

FOOTNOTES $^1$ —CH$_2$—CH$_2$—CH(CH$_3$)(CH$_2$)$_3$CH(CH$_3$)$_2$ = 3M7M8

$^2$ —CH(CH$_3$)C$_2$H$_5$ = 1M3

$^3$ —CH$_2$CH(CH$_3$)C$_2$H$_5$ = 2M4

$^4$ —CH$_2$—CH$_2$—CH(CH$_3$)C$_2$H$_5$ = 3M5

$^5$ —CH$_2$—CH$_2$—CH(CH$_3$)(CH$_2$)$_2$CH=C(CH$_3$)$_2$ = 3M7M8(2E)

$^6$ —CH$_2$CH(Cl)CH$_3$ = 2Cl3

$^7$ —CH$_2$—CH$_2$—CH$_2$—CH(CH$_3$)—C$_2$H$_5$ = 4M6

$^8$ —CH$_2$CH(CH$_3$)—(CH$_2$)$_3$—CH(CH$_3$)$_2$ = 2M6M7 and where $$COO = -\overset{O}{\underset{\|}{C}}-O-$$

$$OCO = -O-\overset{O}{\underset{\|}{C}}-$$

$$SOC = -S-\overset{O}{\underset{\|}{C}}-$$

What is claimed is:

1. A device for affecting incident electromagnetic radiation comprising a ferroelectric liquid crystal material, means for constraining said ferroelectric liquid crystal material to establish a device thickness and means for producing an electric field CHARACTERIZED IN THAT said ferroelectric liquid crystal material is stable and comprises at least two components wherein at least one of said components has the opposite twist sense from a second of said components, whereby the pitch of said ferroelectric liquid crystal material is greater than 50 percent of said device thickness and wherein components are chosen so that the spontaneous polarization of said ferroelectric liquid crystal material is greater than $0.2 \times 10^{-8}$ coul/cm$^2$.

2. The device of claim 1 wherein said pitch is at least 20 μm.

3. The device of claim 1 wherein said means for applying an electric field comprises two electrodes.

4. The device of claim 1 wherein at least one of said components has an optical tilt direction greater than the X-ray tilt direction.

5. The device of claim 1 wherein at least one of said components has an optical tilt direction less than the X-ray tilt direction.

6. The device of claim 1 wherein said components are all in the trans conformation.

7. The device of claim 1 wherein the spontaneous polarization of at least two of said components is in the same sense.

* * * * *